United States Patent
Jensvold et al.

(10) Patent No.: US 6,168,649 B1
(45) Date of Patent: Jan. 2, 2001

(54) MEMBRANE FOR SEPARATION OF XENON FROM OXYGEN AND NITROGEN AND METHOD OF USING SAME

(75) Inventors: John A. Jensvold, Benicia; Thomas O. Jeanes, Antioch, both of CA (US)

(73) Assignee: MG Generon, Inc., Malvern, PA (US)

( * ) Notice: Under 35 U.S.C. 154(b), the term of this patent shall be extended for 0 days.

(21) Appl. No.: 09/208,530

(22) Filed: Dec. 9, 1998

(51) Int. Cl.[7] .................................................. B01D 53/22
(52) U.S. Cl. .............................. 95/47; 95/51; 95/54; 96/9
(58) Field of Search ....................... 95/45, 47–55; 96/4–14

(56) References Cited

U.S. PATENT DOCUMENTS

| | | | |
|---|---|---|---|
| Re. 30,351 | * | 7/1980 | Hoehn et al. ............... 95/54 |
| 3,028,364 | | 4/1962 | Conix et al. . |
| 3,028,365 | | 4/1962 | Schnell et al. . |
| 3,030,331 | | 4/1962 | Goldberg . |
| 3,169,121 | | 2/1965 | Goldberg . |
| 3,207,814 | | 9/1965 | Goldberg . |
| 3,228,876 | | 1/1966 | Mahon ................... 210/22 |
| 3,307,330 | * | 3/1967 | Niedzielski et al. ........ 95/45 |
| 3,455,460 | | 7/1969 | Mahon et al. ........... 210/321 |
| 3,475,331 | | 10/1969 | McLain .................. 210/321 |
| 3,526,001 | | 8/1970 | Smith ..................... 210/23 |
| 3,690,465 | | 9/1972 | McGinnis et al. ........ 210/321 |
| 3,702,658 | | 11/1972 | McNamara et al. ...... 210/321 |
| 3,755,034 | | 8/1973 | Mahon et al. ........... 156/169 |
| 3,801,401 | | 4/1974 | Cope et al. .............. 156/172 |
| 3,872,014 | | 3/1975 | Schell .................... 210/232 |
| 3,966,616 | | 6/1976 | Bray ................... 210/433 M |
| 4,045,851 | | 9/1977 | Ashare et al. ............ 29/157 R |
| 4,061,574 | | 12/1977 | Clark ................... 210/321 R |
| 4,080,296 | | 3/1978 | Clark ................... 210/323 R |
| 4,083,780 | | 4/1978 | Call ....................... 210/23 H |
| 4,119,417 | * | 10/1978 | Heki et al. .................. 96/7 |
| 4,137,128 | | 1/1979 | Watson .................... 202/256 |
| 4,156,069 | | 5/1979 | Prevorsek et al. ......... 528/182 |
| 4,194,038 | | 3/1980 | Baker et al. ............. 528/182 |

(List continued on next page.)

FOREIGN PATENT DOCUMENTS

| | | | |
|---|---|---|---|
| 444690 | | 9/1991 | (EP) . |
| 0596268 | * | 5/1994 | (EP) ........................... 95/47 |
| 603798 | | 6/1994 | (EP) . |
| 53-066880 | * | 6/1978 | (JP) ........................... 95/54 |

OTHER PUBLICATIONS

S. Kimura et al., "Separation of Rare Gases by Membranes", *Radiochem. Radioanal. Letters* 13/56 349–354, 1973, (Apr. 30, 1973).

* cited by examiner

*Primary Examiner*—Robert H. Spitzer
(74) *Attorney, Agent, or Firm*—William H. Eilberg (57) ABSTRACT

A gas-separation membrane enables the economical separation of noble gases, especially xenon, from oxygen, nitrogen, carbon dioxide or mixtures of the latter gases. The membrane of the present invention includes a thin discriminating layer selected from the group consisting of polycarbonate, polyester, and polyestercarbonate. In the preferred embodiment, the thin discriminating layer includes material selected from the bisphenolic group consisting of 2,2-bis(3,5-dibromo-4-hydroxyphenyl)propane, 2,2-bis(3,5-dichloro-4-hydroxyphenyl)propane, and 9,9-bis(3,5-dibromo-4-hydroxyphenyl)fluorene. The invention also includes the method of using the membrane, made as described above, either in a single-stage process or in a multiple-stage process, to provide the desired product gas. Several membrane units, made according to the present invention, may be manifolded together so as to operate in a parallel fashion, to provide an increased volume of product gas at the same desired purity. Alternatively, two or more membrane devices may be connected in a series or staged configuration to provide a smaller volume of highly purified product gas.

15 Claims, 3 Drawing Sheets

U.S. PATENT DOCUMENTS

| | | | |
|---|---|---|---|
| 4,220,535 | 9/1980 | Leonard | 210/321 R |
| 4,235,723 | 11/1980 | Bartlett, Jr. | 210/321 R |
| 4,255,556 | 3/1981 | Segal et al. | 528/190 |
| 4,265,763 | 5/1981 | Bollinger et al. | 210/323.2 |
| 4,310,652 | 1/1982 | DeBona et al. | 528/125 |
| 4,311,822 | 1/1982 | Dege et al. | 528/176 |
| 4,315,819 | 2/1982 | King et al. | 210/321.3 |
| 4,337,139 | 6/1982 | Gestaut et al. | 204/292 |
| 4,344,008 | 8/1982 | Major et al. | 310/242 |
| 4,352,092 | 9/1982 | Masuda et al. | 340/347 DA |
| 4,430,219 | 2/1984 | Kuzumoto et al. | 210/321.3 |
| 4,813,983 | 3/1989 | Nohmi et al. | 55/158 |
| 4,818,254 * | 4/1989 | Anand et al. | 95/54 |
| 4,818,452 | 4/1989 | Kneifel et al. | 264/41 |
| 4,822,382 * | 4/1989 | Nelson | 95/54 |
| 4,840,646 * | 6/1989 | Anand et al. | 95/54 |
| 4,851,014 * | 7/1989 | Jeanes | 95/51 |
| 4,874,401 * | 10/1989 | Jeanes | 95/51 |
| 4,929,259 | 5/1990 | Caskey et al. | 55/158 |
| 4,955,993 | 9/1990 | Sanders, Jr. et al. | 55/16 |
| 4,959,082 * | 9/1990 | Admassu et al. | 95/54 |
| 4,975,228 | 12/1990 | Sanders, Jr. et al. | 264/41 |
| 4,994,095 * | 2/1991 | Kawakami et al. | 96/14 X |
| 5,055,114 * | 10/1991 | Kawakami et al. | 95/54 X |
| 5,073,176 * | 12/1991 | Arthur | 95/54 |
| 5,163,977 * | 11/1992 | Jensvold et al. | 95/45 |
| 5,281,253 * | 1/1994 | Thompson | 95/45 X |
| 5,282,969 * | 2/1994 | Xu | 95/45 X |
| 5,352,273 * | 10/1994 | Simmons et al. | 95/45 |
| 5,378,263 * | 1/1995 | Prasad | 95/45 X |
| 5,482,539 * | 1/1996 | Callahan | 95/45 X |
| 5,650,479 * | 7/1997 | Glugla et al. | 95/54 X |

MEMBRANE FOR SEPARATION OF XENON FROM OXYGEN AND NITROGEN AND METHOD OF USING SAME

BACKGROUND OF THE INVENTION

This invention relates to the use of semi-permeable membranes derived from polycarbonates and polyestercarbonates to separate xenon and other noble gases from diluent gases such as oxygen and nitrogen. This invention also includes a method used to separate these gases.

The use of membranes to separate gases is well known in the art. Membranes have been used to recover or isolate a variety of gases, including hydrogen, helium, oxygen, nitrogen, carbon dioxide, methane and light hydrocarbons. Applications of particular interest include the separation of air to provide an enriched nitrogen stream for use as an inert atmosphere over flammable fluids or for food storage. Conversely, the separation of air can provide an enriched oxygen stream for use in enhanced combustion processes. Other embodiments include the separation of carbon dioxide from methane and other light hydrocarbons such as ethane and propane, as part of the tertiary oil recovery process. Still other embodiments include the recovery of nitrogen or helium or hydrogen from natural gas streams. Still further embodiments include the recovery of rare or expensive gases from less expensive diluent gases.

The membrane separation processes described above are based on the relative permeability of two or more gaseous components through the membrane. To separate a gas mixture into two streams, one richer in at least one component and one leaner in at least one component, it is necessary to bring the gas mixture into contact with one side of a semi-permeable membrane through which at least one of the gaseous components selectively permeates. A gaseous component, which selectively permeates through the membrane, passes through the membrane more rapidly than the other component(s) of the mixture. The gas mixture is thereby separated into a stream which is enriched in the selectively permeating component(s) (the permeate) and a stream which is depleted of the selectively permeating component (the retentate). The non-permeating component (s) is concentrated in the retentate stream. A membrane material is chosen for a mixture so that an appropriate degree of separation of the gas mixture can be achieved.

Membranes for gas separation have been fabricated from a wide variety of polymeric materials including cellulose triacetate (CTA); polyolefines such as polyethylene, polypropylene and poly-4-methyl-pentene-1; polycarbonates; polyesters; polysulfones; and polyimides. An ideal gas-separation membrane is characterized by the ability to operate under high temperature and/or pressure while possessing a high separation factor (permselectivity) and a high gas permeability or flux. The problem is finding membrane materials which possess all the desired characteristics. Typically, membrane materials that possess high permselectivity have low gas permeabilities; conversely, those membrane materials which possess high gas permeability or flux, have low permselectivity. Materials that cannot offer a good balance of properties, i.e. permselectivity and permeability, are unlikely to provide sufficient economic justification for commercial use.

Xenon is a very rare and expensive noble gas. It has been successfully used as a relaxant and anesthetic for surgery. The value of xenon is a strong driving force for devising a method for recovering xenon gas in high purity. The current method of recovery involves a cryogenic separation of xenon, oxygen and nitrogen, but this process incurs significant losses of xenon due to the close proximity of the boiling points of the gases. Membranes offer a practical alternative to the cryogenic process and can provide a high purity stream with a lower loss of xenon to the waste stream.

The present invention provides a membrane material which possesses high permselectivity with respect to xenon, and other rare and expensive gases, and a convenient method of using such a membrane to recover xenon or other rare and expensive gases.

SUMMARY OF THE INVENTION

The present invention comprises a gas separation membrane which includes a thin discriminating layer selected from the group consisting of polycarbonate, polyester, and polyestercarbonate. In the preferred embodiment, the thin discriminating layer includes material selected from the bisphenolic group consisting of 2,2-bis(3,5-dibromo-4-hydroxyphenyl)propane, 2,2-bis(3,5-dichloro-4-hydroxyphenyl)propane, and 9,9-bis(3,5-dibromo-4-hydroxyphenyl)fluorene.

The gas separation membrane of the present invention functions as a semi-permeable membrane capable of separating a noble gas from oxygen, nitrogen, carbon dioxide or a mixture thereof. The invention is especially useful in the separation of xenon. The semi-permeable membrane of the present invention exhibits an oxygen/noble gas permselectivity of at least 21.

The devices made with the membranes described above may include a single unit, to produce a product gas, or several units manifolded together so as to operate in a parallel fashion, to provide an increased volume of product gas at the same desired purity. Alternatively, two or more membrane devices may be connected in a series or staged configuration to provide a smaller volume of highly purified product gas. The invention also includes the method of using the membrane of the present invention, either as a single-stage process or as a multiple-stage process, to provide the desired product gas.

The present invention therefore has the primary object of providing a semi-permeable membrane which is capable of economically separating a noble gas from oxygen, nitrogen, carbon dioxide, or a mixture thereof.

The present invention has the further object of providing a semi-permeable membrane which effectively and economically separates xenon from oxygen, nitrogen, carbon dioxide, or a mixture thereof.

The invention has the further object of providing a semi-permeable membrane which separates xenon from other gaseous components, with a permselectivity of at least 21.

The invention has the further object of providing a method of separating a noble gas from oxygen, nitrogen, carbon dioxide, or a mixture thereof.

The invention has the further object of providing various multi-stage processes for separating a noble gas from oxygen, nitrogen, carbon dioxide, or a mixture thereof.

The invention has the further object of making it more economical to separate noble gases, especially xenon, from other gaseous components, by non-cryogenic means.

The reader skilled in the art will recognize other objects and advantages of the present invention, from a reading of the following brief description of the drawings, the detailed description of the invention, and the appended claims.

DETAILED DESCRIPTION OF THE INVENTION

The membranes of this invention are prepared from polycarbonates, polyestercarbonates and polyesters. These polymers are generally synthesized by reacting a bisphenol with phosgene or a phosgene analog to form polycarbonates, by reacting a bisphenol with a dicarboxylic acid or acid chloride or analog to form polyesters or by reacting a bisphenol with some combination of both species to form polyestercarbonates.

The polyestercarbonates of this invention may be prepared as random or block copolymers. Additionally, the polyestercarbonates may be prepared by preparing blends of polyesters and polycarbonates as well as blends of polyestercarbonate and polycarbonates to produce the desired overall carbonate to ester group ratio in the resulting blend. The polymers can be blended by means well known in the art, as exemplified by U.S. Pat. No. 4,710,548, the disclosure of which is incorporated herein by reference. Blends of polyesters and polycarbonates and of polyestercarbonates and polycarbonates are equivalent in function to polyestercarbonates which have the same ester to carbonate ratio.

Preferred polycarbonates, polyestercarbonates and polyesters from which the membranes of this invention are prepared include those which correspond to the formula wherein:

R is separately in each instance a single bond, a —CO—, —SO$_2$—, —O—, —S—, a $C_{1-15}$ divalent aliphatic, cycloaliphatic or aromatic hydrocarbon, a $C_{1-15}$ divalent halocarbon or inertly substituted hydrocarbon, or a $C_{1-15}$ UV or chemically activated hydrocarbon;

$R_1$ is separately in each instance a hydrogen, a halogen, a $C_{1-6}$ alkyl, a $C_{1-6}$ haloalkyl, a $C_{1-4}$ alkoxy or a $C_{1-9}$ alkyl-aryl or haloalkyl-aryl;

$R_2$ is separately in each instance a hydrogen, a halogen or a $C_{1-6}$ alkyl;

$R_3$ is separately in each instance a $C_{1-20}$ divalent hydrocarbon or a $C_{1-20}$ halo substituted divalent hydrocarbon;

x is a number between 0 and 1;

y is a number between 1 and 0; and n is a positive real number of about 20 or greater.

In the formula presented above, R is preferably a direct bond, a $C_{1-15}$ divalent hydrocarbon, a $C_{1-15}$ halo-substituted divalent hydrocarbon or inertly substituted divalent hydrocarbon, or a $C_{1-15}$ UV or chemically activated hydrocarbon. More preferably, R is a $C_{1-15}$ divalent hydrocarbon. Most preferably, R is propylidene or fluorene.

$R_1$ is preferably a hydrogen, a halogen, a $C_{1-6}$ alkyl, a $C_{1-6}$ halo-alkyl, a $C_{1-4}$ alkoxy or a $C_{1-9}$ alkyl-aryl or haloalkyl-aryl. More preferably, $R_1$ is a halogen or a $C_{1-6}$ alkyl. Most preferably, $R_1$ is bromine or methyl.

$R_2$ is preferably a hydrogen, a halogen or a $C_{1-6}$ alkyl. More preferably, $R_2$ is a hydrogen or a halogen. Most preferably, $R_2$ is a hydrogen.

$R_3$ is preferably a $C_{1-20}$ divalent aliphatic or alkyl- or halo-substituted divalent aliphatic hydrocarbon, a $C_{5-20}$ cycloaliphatic or alkyl- or halo-substituted divalent cycloaliphatic hydrocarbon, or a $C_{6-20}$ aromatic or alkyl- or halo-substituted aromatic hydrocarbon. More preferably, $R_3$ is -continued wherein:

$R_4$ is separately in each instance hydrogen, bromine, chlorine, fluorine, phenyl or halo-substituted alkyl; and a is a positive integer from 0 to no more than 6.

$R_3$ is preferably a cyclohexyl, phthaloyl or naphthyl residue; more preferably $R_3$ is phthaloyl or naphthyl residue; most preferably $R_3$ is a terephthaloyl or isophthaloyl residue.

The molecular weight of a polymer is usually controlled through the use of a terminator. Terminators useful in condensation reactions are derived from monofunctional aliphatic alcohols, thiols, aromatic alcohols or amines. Preferably, this terminator is derived from a monofunctional phenol or aliphatic alcohol. Most preferably, this terminator is a paratertiarybutyl phenoxy or methoxy radical.

Preferably, the polymers useful in this invention have an inherent viscosity of between about 0.3 and about 1.2 dL/g.

Bisphenolic groups useful in the preparation of the polycarbonate, polyestercarbonate and polyester polymers used to make the membranes of this invention include 4,4'-dihydroxybiphenyl, 4,4'-dihydroxybenzophenone, 4,4'-dihydroxyphenyl sulfide, 4,4'-dihydroxyphenyl sulfone, 4,4'dihydroxyphenyl methane, 1,1-bis(4-dihydroxyphenyl) ethane, 1,2-bis(4-hydroxyphenyl)ethane, 2,2-bis(4-hydroxyphenyl)propane, 2,2-bis(4-hydroxyphenyl) hexafluoropropane, 1,1-bis (4-hydroxyphenyl)cyclohexane, 9,9-bis(4-hydroxyphenyl)fluorene, 3,3',5,5'-tetramethyl-4,4'-dihydroxy-biphenyl, 3,3',5,5'-tetrachloro-4,4'-dihydroxybiphenyl, 3,3,',5,5'-tetrabromo-4,4'-dihydroxybiphenyl, 3,3',5,5'-tetramethyl-4,4'-dihydroxyphenyl sulfide, 3,3',5,5'-tetrachloro-4,4'-dihydroxyphenyl sulfide, 3,3',5,5'-tetrabromo-4,4'-dihydroxyphenyl sulfide, 3,3',5,5'-tetramethyl-4,4'-dihydroxyphenyl sulfone, 3,3',5,5'-tetrachloro-4,4'-dihydroxyphenyl sulfone, 3,3',5,5'-tetrabromo-4,4'-dihydroxyphenyl sulfone, 3,3',5,5'-tetramethyl-4, 4'dihydroxyphenyl methane, 3,3',5,5'-tetrachloro-4, 4'dihydroxyphenyl methane, 3,3',5,5'-tetrabromo-4, 4'dihydroxyphenyl methane, 1,1-bis(3,5-dimethyl-4-hydroxyphenyl)ethane, 1,1-bis(3,5-dichloro-4-hydroxyphenyl)ethane, 1,1-bis(3,5-dibromo-4-hydroxyphenyl)ethane, 1,2-bis(3,5-dimethyl-4-hydroxyphenyl)ethane, 1,2-bis(3,5-dichloro-4-hydroxyphenyl)ethane, 1,2-bis(3,5-dibromo-4-hydroxyphenyl)ethane, 2,2-bis(3,5-dimethyl-4-hydroxyphenyl)propane, 2,2-bis(3,5-chloro-4-hydroxyphenyl)propane, 2,2-bis(3,5-dibromo-4-hydroxyphenyl)propane, 2,2-bis(3,5-dimethyl-4-hydroxyphenyl)hexafluoropropane, 2,2-bis(3,5-dichloro-4-hydroxyphenyl)hexafluoropropane, 2,2-bis(3,5-dibromo-4-hydroxyphenyl)hexafluoropropane, 1,1-bis(3,5-dimethyl-4-hydroxyphenyl)cyclohexane, 1,1-bis(3,5-dichloro-4-hydroxyphenyl)cyclohexane, 1,1-bis(3,5-dibromo-4-hydroxyphenyl)cyclohexane, 9,9-bis(3,5-dimethyl-4-hydroxyphenyl)fluorene, 9,9-bis(3,5-dichloro-4-hydroxyphenyl)fluorene, and 9,9-bis(3,5-dibromo-4-hydroxyphenyl)fluorene. The more preferred bisphenolics are 4,4'-dihydroxybiphenyl, 4,4'-dihydroxyphenyl sulfide, 4,4'-dihydroxyphenyl sulfone, 4,4'dihydroxyphenyl methane, 1,1-bis(4-dihydroxyphenyl)ethane, 2,2-bis(4-hydroxyphenyl)propane, 2,2-bis(4-hydroxyphenyl)-hexafluoropropane, 1,1-bis (4-hydroxyphenyl)cyclohexane, 9,9-bis(4-hydroxyphenyl)fluorene, 3,3',5,5'-tetrachloro-4,4'-dihydroxybiphenyl, 3,3,',5,5'-tetrabromo-4,4'-dihydroxybiphenyl, 3,3',5,5'-tetrachloro-4,4'-dihydroxyphenyl sulfide, 3,3',5,5'-tetrabromo-4,4'-dihydroxyphenyl sulfide, 3,3',5,5'-tetrachloro-4,4'-dihydroxyphenyl sulfone, 3,3',5,5'-tetrabromo-4,4'-dihydroxyphenyl sulfone, 3,3',5,5'-tetrachloro-4, 4'dihydroxyphenyl methane, 3,3',5,5'-tetrabromo-4, 4'dihydroxyphenyl methane, 1,1-bis(3,5-dichloro-4-hydroxyphenyl)ethane, 1,1-bis(3,5-dibromo-4-hydroxyphenyl)ethane, 2,2-bis(3,5-dimethyl-4-hydroxyphenyl)propane, 2,2-bis(3,5-chloro-4-hydroxyphenyl)propane, 2,2-bis(3,5-dibromo-4-hydroxyphenyl)propane, 2,2-bis(3,5-dimethyl-4-hydroxyphenyl)hexafluoropropane, 2,2-bis(3,5-dichloro-4-hydroxyphenyl)hexafluoropropane, 2,2-bis(3,5-dibromo-4-hydroxyphenyl)hexafluoropropane, 1,1-bis(3,5-dichloro-4-hydroxyphenyl)cyclohexane, 1,1-bis(3,5-dibromo-4-hydroxyphenyl)cyclohexane, 9,9-bis(3,5-dimethyl-4-hydroxyphenyl)fluorene, 9,9-bis(3,5-dichloro-4-hydroxyphenyl)fluorene, and 9,9-bis(3,5-dibromo-4-hydroxyphenyl)fluorene. The even more preferred bisphenolics are 2,2-bis(4-hydroxyphenyl)propane, 2,2-bis(4-hydroxyphenyl)hexafluoropropane, 9,9-bis(4-hydroxyphenyl)fluorene, 2,2-bis(3,5-chloro-4-hydroxyphenyl)propane, 2,2-bis(3,5-dibromo-4-hydroxyphenyl)propane, 2,2-bis(3,5-dichloro-4-hydroxyphenyl)hexafluoropropane, 2,2-bis(3,5-dibromo-4-hydroxyphenyl)hexafluoropropane, 1,1-bis(3,5-dichloro-4-hydroxyphenyl)cyclohexane, 1,1-bis(3,5-dibromo-4-hydroxyphenyl)cyclohexane, 9,9-bis(3,5-dichloro-4-hydroxyphenyl)fluorene, and 9,9-bis(3,5-dibromo-4-hydroxyphenyl)fluorene. The most preferred bisphenolics are 2,2-bis(3,5-dibromo-4-hydroxyphenyl)propane, 2,2-bis (3,5-dibromo-4-hydroxyphenyl)hexafluoropropane, 1,1-bis (3,5-dibromo-4-hydroxyphenyl)cyclohexane, and 9,9-bis(3, 5-dibromo-4-hydroxyphenyl)fluorene.

The polycarbonates useful in this invention may be prepared by any process known in the art which results in polycarbonates with suitable membrane formation properties. For example, polycarbonates may be produced using a solution process by the reaction of phosgene and the appropriate bisphenol in the presence of an HCl acceptor such as pyridine. Similarly, polycarbonates may also be prepared using an interfacial process by dissolving the bisphenol in a caustic solution, providing an organic solvent in which phosgene and carbonate product is soluble and promoting polymerization with an amine. Polycarbonates may also be prepared by a transesterification reaction between the appropriate bisphenol and a carbonate ester such as diphenyl carbonate. The above processes are described in the Kirk-Othmer Encyclopedia of Chemical Technology, 3rd edition, John Wiley & Sons, New York,, 1982, Volume 18, pp 479–494.

The polyestercarbonates useful in this invention may be prepared by reacting the appropriate bisphenol with a difunctional ester forming agent in the presence of phosgene. Preferred ester forming agents are dicarboxylic acids or dicarboxylic acid halides such as $C_{1-20}$ hydrocarbons substituted with two carboxylic acid or carboxylic acid halide moieties. More preferred dicarboxylic acids or dicarboxylic acid halides include $C_{1-20}$ aliphatic dicarboxylic acids, $C_{1-20}$ aliphatic acid halides, $C_{5-20}$ cycloaliphatic carboxylic acids, $C_{5-20}$ cycloaliphatic carboxylic acid halides, $C_{6-20}$ aromatic carboxylic acids, and $C_{6-20}$ aromatic carboxylic acid halides.

The most preferred class of ester forming agents, used in making the polyestercarbonates described above, is the class of dicarboxylic acid halides. Preferred dicarboxylic acid halides include those corresponding to the following:

wherein x is a halogen and $R_4$ and a are as previously defined.

The preferred dicarboxylic acid halides useful in this invention include 1,4-cyclohexane dicarboxylic acid chloride, 1,4-cyclohexane dicarboxylic acid bromide, 1,3-cyclohexane dicarboxylic acid chloride, 1,3-cyclohexane dicarboxylic acid bromide, terephthaloyl chloride, terephthaloyl bromide, isophthaloyl chloride, isophthaloyl bromide, phthaloyl chloride, phthaloyl bromide, 2-bromo-1,4-benzenedicarbonyldichloride, 2-chloro-1,4-benezenedicarbonyldichloride, 2-methyl-1,4-benzenedicarbonyldichloride, 5-bromo-1,3-benzenedicarbonyldichloride, 5-chloro-1,3-benzenedicarbonyldichloride, 5-methyl-1,3-benzenedicarbonyldichloride, 4,5-dibromo-1,2-benzenedicarbonyldichloride, 4,5-dichloro-1,2-benzenedicarbonyldichloride, 2,6-naphthylene dicarbonyldichloride or 2,6-naphthylene dicarbonyldibromide. More preferred acid halides are terephthaloyl chloride, isophthaloyl chloride, 1,4-cyclohexane dicarboxylic acid chloride and 2,6-naphthylene dicarbonyldichloride. The most preferred dicarboxylic acid chlorides are terephthaloyl chloride, isophthaloyl chloride or mixtures thereof.

In a preferred embodiment in which a mixture of terephthaloyl chloride and isophthaloyl chloride is used as the ester forming agent, the ratio of terephthaloyl chloride to isophthaloyl chloride may be from 100:0 to 0:100, preferably from about 80:20 to about 20:80.

The polyestercarbonates of this invention may be prepared by techniques known in the art. The solution process is one preferred process for the manufacture of polyestercarbonates which are the subject of this invention. In the solution process, the bisphenol in a chlorinated solvent in the presence of a tertiary amine acid acceptor is contacted with a dicarboxylic acid or acid chloride in the presence of phosgene with agitation. See U.S. Pat. Nos. 3,028,365, 4,194,038, and 4,310,652, the disclosures of which are all hereby incorporated by reference herein. See also P. W. Morgan, Condensation Polymers: By Interfacial and Solution Methods, Interscience, 1965, pages 523–393.

In another preferred process for preparing polyestercarbonates, the interfacial process, an aqueous bisphenolate solution with a pH of at least about 8 is mixed with phosgene and an organic solution of an acid halide which solution is immiscible with the aqueous bisphenolate solution. The components are agitated for a sufficient time at a temperature so as to react the phosgene and the acid halide with the bisphenolate to form an amorphous polymer. The aqueous phase containing the amorphous polymer is separated from the organic phase. The organic phase is then washed with an aqueous liquid. An amorphous, melt-processable polyestercarbonate is recovered from the washed organic phase. The organic phase may be based upon any conventional organic solvent for the product polymer. A preferred group of solvents includes chlorinated aliphatic $C_{1-4}$ hydrocarbons such as methylene chloride, chloroform, carbon tetrachloride, dichloroethane, trichloroethane, trichloroethylene, tetrachloroethylene and mixtures thereof. Another preferred group of solvents includes chlorinated and non-halogenated aromatic hydrocarbons such as toluene, chlorobenzene, dichlorobenzene and mixtures thereof. Preferred solvents are the chloromethanes, especially methylene chloride. The bisphenols useful in this invention are converted to bisphenolates by dissolving the bisphenol in water with an inorganic base, especially in an aqueous or alkaline earth metal hydroxide, preferably an alkali metal hydroxide, more preferably sodium hydroxide. Further descriptions of the interfacial processes can be found in U.S. Pat. Nos. 3,169,121, 3,030,331, 3,028,364, 4,137,128, 4,156,069, 3,207,814, 4,255,556, and 4,311,822, the disclosures of all of which are hereby incorporated by reference herein. See also P. W. Morgan, supra.

The ratio of acid halide to phosgene generally controls the relative ratio of ester to carbonate units, with a higher ratio of acid halides resulting in a higher ester content and a lower ratio of acid halides resulting in a lower ester content. Generally, the molar ratio of phosgene to acid halide or carboxylic acid is between about 0.02:1 and about 20:1.

Polyesters of this invention may be prepared in similar fashion to the polyestercarbonates as described above. The polyesters useful in this invention may be prepared by reacting the appropriate bisphenol with a difunctional ester forming agent. As above, preferred ester forming agents are dicarboxylic acids or dicarboxylic acid halides such as $C_{1-20}$ hydrocarbons substituted with two carboxylic acid or carboxylic acid halide moieties. More preferred dicarboxylic acids or dicarboxylic acid halides include $C_{1-20}$ aliphatic dicarboxylic acids, $C_{1-20}$ aliphatic acid halides, $C_{5-20}$ cycloaliphatic carboxylic acids, $C_{5-20}$ cycloaliphatic carboxylic acid halides, $C_{6-20}$ aromatic carboxylic acids, and $C_{6-20}$ aromatic carboxylic acid halides.

The most preferred class of ester forming agents, used in making the polyesters described above, is the class of dicarboxylic acid halides. Preferred dicarboxylic acid halides include those corresponding to the following:

-continued wherein x is a halogen and $R_4$ and a are as previously defined.

The preferred dicarboxylic acid halides useful in this invention include 1,4-cyclohexane dicarboxylic acid chloride, 1,4-cyclohexane dicarboxylic acid bromide, 1,3-cyclohexane dicarboxylic acid chloride, 1,3-cyclohexane dicarboxylic acid bromide, terephthaloyl chloride, terephthaloyl bromide, isophthaloyl chloride, isophthaloyl bromide, phthaloyl chloride, phthaloyl bromide, 2-bromo-1,4-benzenedicarbonyldichloride, 2-chloro-1,4-benezenedicarbonyldichloride, 2-methyl-1,4-benzenedicarbonyldichloride, 5-bromo-1,3-benzenedicarbonyldichloride, 5-chloro-1,3-benzenedicarbonyldichloride, 5-methyl-1,3-benzenedicarbonyldichloride, 4,5-dibromo-1,2-benzenedicarbonyldichloride, 4,5-dichloro-1,2-benzenedicarbonyldichloride, 2,6-naphthylene dicarbonyldichloride or 2,6-naphthylene dicarbonyldibromide. More preferred acid halides are terephthaloyl chloride, isophthaloyl chloride, 1,4-cyclohexane dicarboxylic acid chloride and 2,6-naphthylene dicarbonyldichloride. The most preferred dicarboxylic acid chlorides are terephthaloyl chloride, isophthaloyl chloride or mixtures thereof.

In a preferred embodiment in which a mixture of terephthaloyl chloride and isophthaloyl chloride is used as the ester forming agent, the ratio of terephthaloyl chloride to isophthaloyl chloride may be from 100:0 to 0:100, preferably from about 80:20 to about 20:80.

The polyesters of this invention may be prepared by techniques known in the art. The solution process is one preferred process for the manufacture of polyesters which are the subject of this invention. In the solution process, the bisphenol in a chlorinated solvent in the presence of a tertiary amine acid acceptor is contacted with a dicarboxylic acid or acid chloride with agitation.

In another preferred process for preparing polyesters, the interfacial process, an aqueous bisphenolate solution with a pH of at least about 8 is mixed with an organic solution of an acid halide which solution is immiscible with the aqueous bisphenolate solution. The components are agitated for a sufficient time at a temperature so as to react the acid halide with the bisphenolate to form an amorphous polymer. The aqueous phase containing the amorphous polymer is separated from the organic phase. The organic phase is then washed with an aqueous liquid. An amorphous, melt-processable polyester is recovered from the washed organic phase. The organic phase may be based upon any conventional organic solvent for the product polymer. A preferred group of solvents includes chlorinated aliphatic $C_{1-4}$ hydrocarbons such as methylene chloride, chloroform, carbon tetrachloride, dichloroethane, trichloroethane, trichloroethylene, tetrachloroethylene and mixtures thereof. Another preferred group of solvents includes chlorinated and non-halogenated aromatic hydrocarbons such as toluene, chlorobenzene, dichlorobenzene and mixtures thereof. Preferred solvents are the chloromethanes, especially methylene chloride. The bisphenols useful in this invention are converted to bisphenolates by dissolving the bisphenol in water with an inorganic base, especially in an aqueous or alkaline earth metal hydroxide, preferably an alkali metal hydroxide, more preferably sodium hydroxide.

The membranes of this invention may be homogeneous, composite, or asymmetric membranes. Preferably, the membranes of this invention are asymmetric or composite. In addition, the membranes may be shaped in the form of flat sheets, hollow fibers, or hollow tubes.

Homogeneous membranes are prepared by forming a thin discriminating layer which is dense and free of voids and pores. Such membranes generally have the same structure and composition throughout the membrane. In one preferred embodiment, the polycarbonate, polyestercarbonate and polyester of this invention are dissolved in a water-miscible solvent, for example, dimethylformamide (DMF), dimethylacetamide (DMAc) or N-methylpyrrolidinone (NMP). Additional solvents suitable for forming membranes include chlorinated hydrocarbons such as methylene chloride, chloroform, trichloroethane, trichloroethylene, tetrachloroethylene and the like and other suitable organic solvents such as dioxane, and tetrahydrofuran. The configuration into which the membrane is to be formed determines the membrane solution composition. To form a flat sheet membrane, a solution with about 10 to 20 weight percent of polymer is preferred, with about 15 to 20 weight percent of polymer being more preferred. To form a hollow fiber membrane, a solution with about 30 to 80 weight percent polymer is preferred, with about 40 to 70 weight percent of polymer being more preferred.

The polymer solution should be homogeneous and possess sufficient viscosity to allow casting of the solution onto a flat surface. The casting surface is such that the finished membrane may thereafter be readily separated. One method of carrying out this operation is by casting the polymer solution onto a support surface which may be dissolved away from the finished membrane following drying and curing. Alternately, the membrane may be cast onto a support having a low surface energy, such as silicone, coated glass, or a surface to which the membrane will not adhere, such as mercury. Casting is performed by pouring the solution onto the appropriate surface and drawing down the polymer solution using an appropriate tool to form a solution of the appropriate thickness.

Thereafter, the cast solution is exposed to drying or curing conditions. Such conditions are used to remove the solvent, thereby leaving a thin discriminating layer of polymer which is homogeneous. The solution may be dried by exposing the solution to a vacuum, exposing the solution to elevated temperature, allowing the solvent to evaporate from the solution over time, or a combination thereof. Generally, it is preferable to expose the cast solution to elevated temperature. Any temperature at which the solvent evaporates in a reasonable period of time and which is below the glass transition temperature of the polymer is suitable, preferably less than about 100 degrees Celsius, more preferably less than about 80 degrees Celsius. In one preferred embodiment, such exposure is done under vacuum at elevated temperature conditions. The drying is performed over a period sufficient to remove the solvent, preferably between 24 and 48 hours.

Many homogeneous polycarbonate, polyestercarbonate and polyester membranes may alternately be formed by the melt extrusion process. The polymers may be extruded and drawn down into films using conventional extrusion equipment. Typically, the polymers of this invention may be extruded at temperatures from about 220° to about 300° C.

In a composite membrane, the thin discriminating layer of the membrane is supported on a porous substructure or substrate. The porous substrate generally does not greatly impede the transport of components through the membrane. To prepare a composite membrane, a homogeneous, thin discriminating layer can be formed and thereafter adhered to a porous support after formation. Alternatively, the porous support can be the surface upon which the membrane is cast or laminated. In one embodiment, the composite membrane is prepared by casting or laminating a membrane forming solution as a uniform coating on the porous support which forms the support layer for the finished membrane. Penetration of the polymer into pores of the porous support layer is minimized using standard techniques known in the art. In one embodiment, the support layer may be a metal or polymeric plate with a plurality of holes drilled into it. However, such a drilled plate is not advantageous because it can significantly reduce the effective surface area of the membrane. In a preferred embodiment, the porous support layer is a very porous polymer membrane. Illustrative of such polymeric support layers are porous cellulose ester and microporous polysulfone membranes. Such membranes are commercially available under the trademarks MILLIPORE, PELLICON, and DIAFLOW. Where such support membranes are thin or highly deformable, a screen or other support frame may be necessary to support adequately the semi-permeable membrane. In one especially preferred embodiment, the polymeric support layer is in the form of a hollow fiber of a microporous polymer such as cellulose ester or polysulfone. The hollow fiber itself provides adequate support for the thin discriminating layer coated on the inside or the outside of the hollow fiber. After the thin discrimination layer is coated onto the porous support, the composite membrane is exposed to conditions for removal of the solvent so as to form the dense skin. Such conditions are similar to those hereinbefore described for the formation of homogeneous membranes.

To form an asymmetric membrane, a solution is cast as hereinbefore described, and thereafter the cast solution is partially cured to remove a portion of the solvent. Thereafter, one or both surfaces of the partially dried membrane is contacted with a quench liquid such as water so as to form a thin discriminating layer on one or both sides of the membrane, under conditions such that the solvent below the dense layer communicates to the dense layer forming pores in the remainder of the membrane, thereby forming an asymmetric membrane. Such porous layer is present to provide support for the thin discriminating layer without impeding the transport of the fluid containing the components to be separated by the semi-permeable, thin discriminating layer. The partial curing step is performed in a manner similar to the curing step described with respect to the formation of homogeneous membranes.

Hollow fiber membranes can be formed by spinning fibers from an appropriate solution of the polycarbonate, polyestercarbonate or polyester in a water-miscible solvent or by melt extrusion. Such spinning processes are well known to those skilled in the art, and the formation of homogeneous, asymmetric, or composite membranes requires the adaptation of the hereinbefore described procedures to the hollow fiber membrane form. Such adaptations are well within the skill of the art.

The membranes used in the invention are relatively thin. The thickness of such homogeneous membranes is preferably greater than about 5 microns, and less than about 500 microns. More preferably, the membrane thickness for a homogeneous membrane is between about 10 and about 300 microns. In the case of composite or asymmetric membranes, the active discriminating layer is preferably between about 0.05 and 10 microns, more preferably between about 0.05 and 5 microns.

The membranes are fabricated into flat sheet, spiral, tubular, or hollow fiber devices by methods described in the art. The membranes are sealingly mounted in a pressure vessel in such a manner that the membrane separates the vessel into two fluid regions wherein fluid flow between the two regions is accomplished by fluid permeating through the membrane. For examples of conventional membrane device designs and fabrication methods, see U.S. Pat. Nos. 3,228, 876: 4,344,008; 3,455,460; 3,475,331; 3,526,001; 3,538, 553; 3,690,465; 3,702,658; 3,755,034; 3,801,401; 3,872, 014; 3,966,616; 4,045,851; 4,061,574; 4,080,296; 4,083, 780; 4,220,535; 4,235,723; 4,265,763; 4,430,219; 4,352, 092; 4,337,139; 4,315,819; 4,813,983; 4,818,452; 4,929, 259; 4,955,993; and 4,975,228, the disclosures of all of which are hereby incorporated by reference herein.

Figure 1:
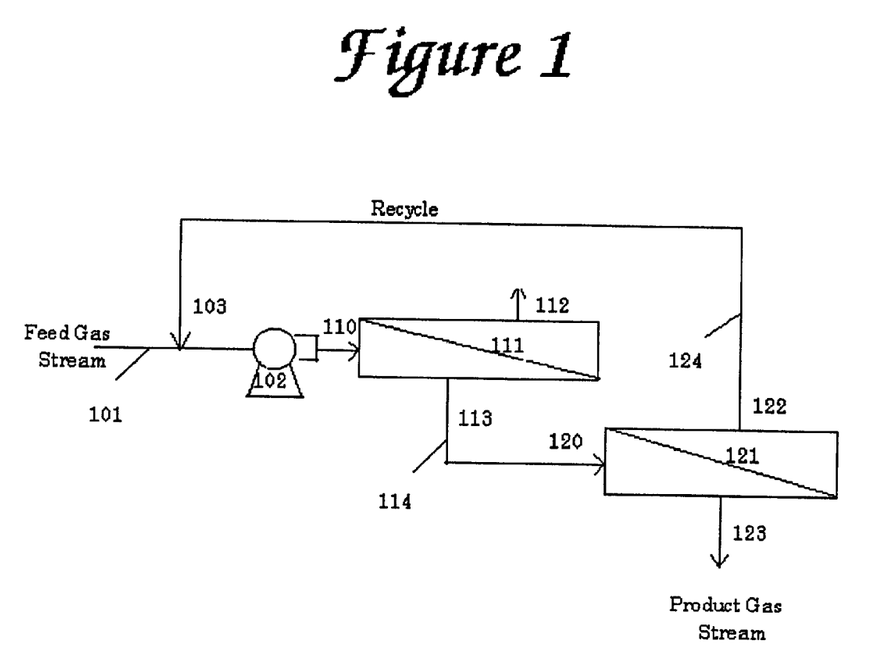
FIG. 1 provides a schematic flow diagram of a two-stage membrane configuration with a recycle stream, according to the present invention.

FIG. 1 shows a schematic flow diagram of a two-stage membrane configuration with a recycle stream, according to the present invention. In FIG. 1, the feed stream is passed via inlet line 101 to compressor 102, and the compressed gas is advanced to feed inlet port 110 of a first membrane device. The feed stream may be any suitable gaseous fluid containing at least one moiety, which is to be recovered. Preferably the feed stream is provided at a substantially constant total pressure and substantially constant composition. The total pressure of the feed stream may be any pressure suitable for effecting fluid separation by permeation through selectively permeable membranes. The feed stream pressure is at least about 30 pounds per square inch absolute (psia), more desirably between about 30 psia and 500 psia, and most desirably between about 75 psia and 250 psia. The temperature of the feed stream is between about 5° and 100° C., more preferably between about 15° C. and 85° C., and most preferably between about 20° C and 60° C.

Within the first membrane device, the compressed feed gas is permeated through membrane 111 and the gas stream enriched in the faster permeating components of the feed stream exits the first membrane device at low pressure through permeation port 112 and is discharged to the atmosphere. The non-permeated gas that is enriched in the slower permeating components of the feed gas stream exits the first membrane device at a slightly decreased pressure through retentate port 113.

The first retentate stream is conveyed through pipe 114 to feed inlet port 120 of the second membrane device. Within the second membrane device, the compressed feed gas is permeated through membrane 121, and the gas stream which is enriched in the faster permeating components of the feed stream, exits the second membrane device at low pressure through permeation port 122. The permeated gas is conveyed through pipe 124 to gas port 103 located upstream of compressor 102 where it is mixed with the feed gas stream, thereby enhancing the composition of the feed gas stream. The non-permeated gas that is enriched in the slower permeating components of the feed stream, exits the second membrane device at a slightly decreased pressure through retentate port 123 and is collected as the desired product gas.

Figure 2:
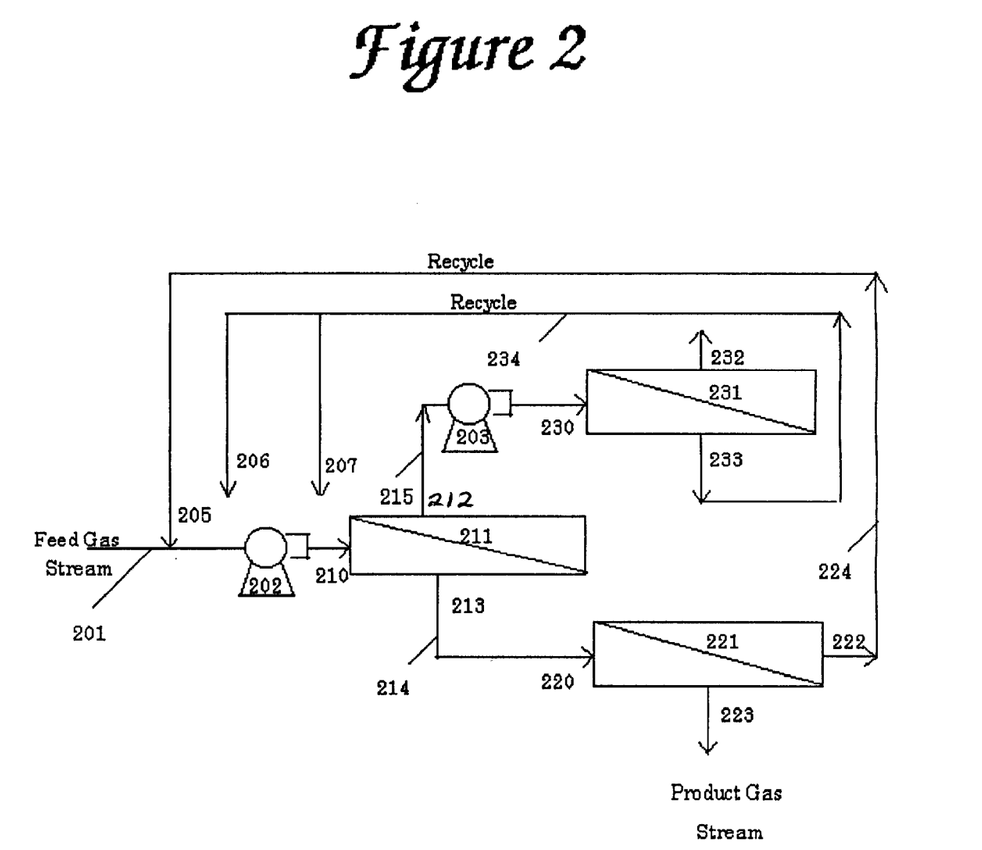
FIG. 2 provides a schematic flow diagram of a two-stage membrane configuration with dual recycle streams comprising three membrane devices.

FIG. 2 shows a two-stage membrane configuration with dual recycle streams and having three membrane devices. The feed stream is passed through inlet line 201 to compressor 202, and the compressed gas is advanced to feed inlet port 210 of the first membrane device. With the first membrane device, the compressed feed gas is permeated through membrane 211 and the gas stream, enriched in the faster permeating components of the feed stream, exits the first membrane device at low pressure through permeation port 212. The non-permeated gas, which is enriched in the slower permeating components of the feed gas stream, exits the first membrane device at a slightly decreased pressure through retentate port 213.

The first retentate stream is conveyed through pipe 214 to feed inlet port 220 of the second membrane device. Within the second membrane device, the compressed feed gas is permeated through membrane 221 and the gas stream, enriched in the faster permeating components of the feed gas stream, exits the second membrane device at low pressure, through permeation port 222. The permeated gas is conveyed through pipe 224 to gas port 205, where it is mixed with the feed gas stream, thereby enhancing the composition of the feed gas stream. The non-permeated gas that is enriched in the slower permeating components of the feed stream, exits the second membrane device at a slightly decreased pressure through retentate port 223, and is collected as the desired product gas.

The first permeate stream is conveyed through pipe 215 to second compressor 203 where the gas is recompressed to a feed pressure of at least about 30 psia, more desirably between about 30 psia and 500 psia, and most desirably between about 75 psia and 250 psia. The recompressed gas is advanced to feed inlet port 230. Within the third membrane device, the compressed feed gas is permeated through membrane 231 and the gas stream, enriched in the faster permeating components of the feed gas stream, exits the third membrane device at low pressure through permeation port 232, and is vented to the atmosphere. The non-permeated gas that is enriched in the slower permeating components of the feed gas stream exits the third membrane device at a slightly decreased pressure through retentate port 233.

The third retentate stream is conveyed through pipe 234 to gas port 206, located upstream of compressor 202, where it is mixed with the feed gas stream. Alternately, the third retentate stream is conveyed through pipe 234 to gas port 207, located between compressor 202 and inlet port 210, where it is mixed with the compressed feed gas stream.

Figure 3:
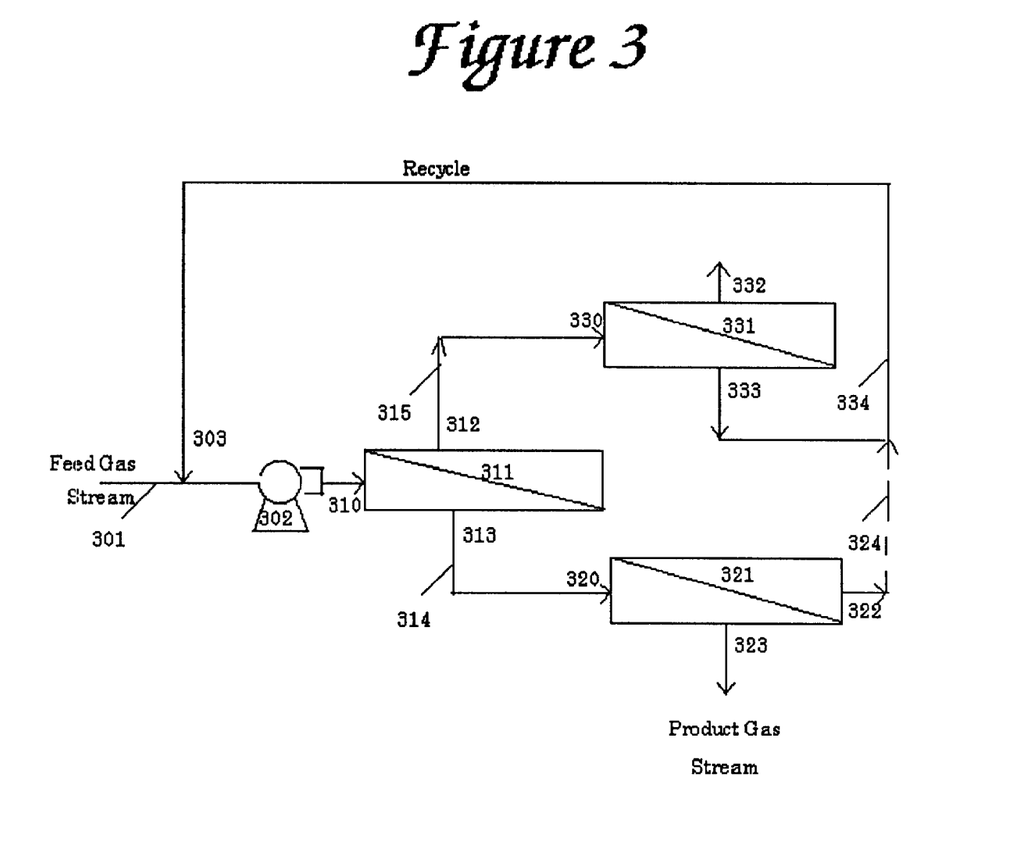
FIG. 3 provides a schematic flow diagram of a two-stage membrane configuration with a single recycle stream, comprising three membrane devices.

FIG. 3 provides a schematic flow diagram of a two-stage membrane configuration with a single recycle stream, comprising three membrane devices. The feed stream is passed via inlet line 301 to compressor 302, and the compressed gas is advanced to the feed inlet port 310 of the first membrane device. Within the first membrane device, the compressed feed gas is permeated through membrane 311 and the gas stream, enriched in the faster permeating components of the feed stream, exits the first membrane device at low pressure through permeation port 312. The non-permeated gas that is enriched in the slower permeating components of the feed gas stream exits the first membrane device at a slightly decreased pressure through the retentate port 313.

The first retentate stream is conveyed through pipe 314 to feed inlet port 320 of the second membrane device. Within the second membrane device, the compressed feed gas is permeated through membrane 321 and the gas stream, enriched in the faster permeating components of the feed gas stream, exits the second membrane device at low pressure through permeation port 322, where it is discharged to the atmosphere. The second permeate stream may optionally be combined through pipe 324 with the third retentate stream and recycled to the feed gas stream. The non-permeated gas, that is enriched in the slower permeating components of the feed gas stream, exits the second membrane device at a slightly decreased pressure through retentate port 323 and is collected as the desired product gas.

The first permeate stream is conveyed through pipe 315 to feed inlet port 330. Within the third membrane device, the compressed feed gas is permeated through membrane 331 and the gas stream, enriched in the faster permeating components of the feed gas stream, exits the third membrane device at low pressure through permeation port 332 where it is discharged to the atmosphere. The non-permeated gas, that is enriched in the slower permeating components of the feed gas stream, exits the third membrane device at a slightly decreased pressure through retentate port 333. The third retentate stream is conveyed through pipe 334 to gas port 303 located before compressor 302 where it is mixed with the feed gas stream.

The membranes of the present invention are used to isolate or recover gases from gas mixtures. The feed gas mixture may contain gases such as hydrogen, helium, oxygen, nitrogen, carbon dioxide, carbon monoxide, methane and other light hydrocarbons, gases such as argon, neon, xenon, and other gases such as nitrogen dioxide, nitrous oxide, and sulfur dioxide. One side of the membrane is contacted with a feed gas mixture under pressure, while a pressure differential is maintained across the membrane. At least one of the components in any given gas mixture selectively permeates through the membrane more rapidly than the other component or components. A stream is obtained on the low pressure side of the membrane which is enriched in the faster permeating component or components. The permeated gas is removed from the low pressure (downstream) side of the membrane. A stream depleted in the faster permeating gas is withdrawn from the high pressure (upstream) side of the membrane.

The separation process should be carried out at pressures which do not adversely affect the membrane. In the case where oxygen is separated from nitrogen and other components, the pressure differential across the membrane is preferably between about 10 and 500 psig, more preferably between about 50 and 350 psig. In the case where carbon dioxide is separated from methane and other components, the pressure differential is preferably between about 10 and 1000 psig, more preferably between about 50 and 500 psig. The separation process should be carried out at temperatures which do not adversely affect membrane integrity. Under continuous operation, the operating temperature is preferably from about −50 to about 100 degrees Celsius, more preferably from about −10 to about 50 degrees Celsius.

Gas permeability (P) is defined as $$P = \frac{\text{(amount of permeant)(membrane thickness)}}{\text{(area)(time)(driving force across the membrane)}}$$

A standard permeability measurement unit is the Barrer (Ba), which is defined as $$Ba = \frac{(\text{centimeter})^3 (STP)(\text{centimeter})}{(\text{centimeter})^2 (\text{second})(\text{cm Hg})} \times 10^{-10}$$

The reduced flux is defined as $$J_R = \frac{\text{centimeter}^3}{(\text{centimeter})^2 (\text{second})(\text{cm Hg})} \times 10^{-6}$$

The separation factor (selectivity or permselectivity) is defined as the ratio of the permeability or flux of the faster permeating gas to the permeability or flux of the slower permeating gas.

The following Examples are included to illustrate the invention, and are not intended to limit the scope of the invention or of the claims.

EXAMPLE 1

A blend of tetrabromobisphenol A polycarbonate (TBBAPC), N-methylpyrrolidone (NMP) and triethylene glycol (TEG) was extruded through a multi-hole spinnerette, through an air gap (air quench zone) and into a liquid quench bath. From the liquid bath the fiber was passed into a second liquid bath, and was taken up on a package leesona. The hollow fibers were then air dried. The fibers were tested for membrane properties as described below.

After the fiber was dried, the fibers were tested for permeation properties. The test device was a pressure vessel with four ports, two tubesheet ports, one feed port through which the compressed gas enters the vessel, and an exit or purge port through which the compressed gas can be purged from the vessel. One hundred eighty (180) fibers were passed into one of the tubesheet ports and out the other allowing for a 31.5 cm length of the fibers to be contained within the test device. Epoxy tubesheets were formed in the two tubesheet ports to give a leak-tight bond between the fiber and the two ports. This configuration was designated a beaker test device.

The test unit was operated at 25° C. and pressurized with nitrogen at 50 psig by allowing compressed nitrogen to enter the test device through the feed port while leaving the exit port closed. The exit port was then opened for two minutes to purge the vessel of air and then closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports where the flow rate was measured by means of a bubble meter. There is negligible back pressure on the gas exiting the tubesheet. After testing with nitrogen, the feed gas was changed to oxygen and the vessel was purged for about two minutes to give pure oxygen at 50 psig in the test device. The amount of oxygen permeating through the fiber walls was measured by combining the outputs from the two tube-sheet ports. Similarly, the vessel was purged with xenon for about two minutes to give pure xenon at 50 psig in the test device. The amount of xenon permeating through the fiber walls was measured by means of a bubble flow meter. The average results from four test units are listed below in Table I.

TABLE I

| Example | Oxygen Flux | Nitrogen Flux | $O_2/N_2$ | Xenon Flux | $O_2/Xe$ |
|---|---|---|---|---|---|
| Example 1 | 13.2 | 1.72 | 7.7 | 0.364 | 36.3 |

EXAMPLE 2

Once again, the fiber was dried, and assembled into a test device. This test device was also a pressure vessel with three ports, two of which are tubesheet ports, i.e. having fibers embedded in epoxy: one feed port through which the compressed gas enters the vessel, and one non-permeate port and a single permeate port, located nearest the feed port in a counter-current collection configuration. Fibers were passed into one of the tubesheet ports, through a hollow tube and out the other tubesheet port allowing for a length of the fibers to be contained within the test device. Total fiber surface area is approximately 0.22 m². Epoxy tubesheets were formed in the two tubesheet ports to give a leak-tight bond between the fiber and the two ports. This configuration was designated a loop cell test device.

The test unit was operated at 25° C. and with a mixed gas stream at 135 psig by allowing compressed gas to enter the test device through the feed port and not restricting flow through the non-perm port. The test unit was then pressurized at 135 psig by restricting the flow of gas through the non-perm port, thereby forcing the gas to permeate through the fiber and exit through the permeate port. Flow meters were used to monitor the feed flow, non-perm flow and the perm flow. The gas composition at each location was determined with an HP 5890 Gas Chromatograph equipped with a J&W Scientific (0.53 mm×30 meter) molecular sieve column. The GC oven termperature was maintained at 4030 C. while the injection port was set at 250° C. and the detector port was set at 150° C. The loop cell test device was operated by adjusting the non-perm flow such that it represented some percentage (recovery) of the total flow from both the non-perm port and the perm port. The average non-perm composition from three test runs at a given recovery as well as permeate and non-permeate flow for two feed compositions are listed below in Table II and Table III. The unit of gas flow in these tables is scc/min.

TABLE II

| Recovery | % $O_2$ | % $N_2$ | % Xe | Perm Flow | Non-perm Flow |
|---|---|---|---|---|---|
| 100 | 24 | 6 | 70 | — | — |
| 32.3 | 0.2 | 5.3 | 94.5 | 109 | 52 |
| 51.3 | 4.3 | 6.7 | 89.0 | 112 | 118 |
| 67.7 | 9.0 | 7.1 | 83.9 | 119 | 249 |
| 73.1 | 12.0 | 6.9 | 81.1 | 120 | 326 |
| 80.4 | 14.0 | 7.1 | 78.9 | 123 | 504 |

TABLE III

| Recovery | % $O_2$ | % $N_2$ | % Xe | Perm Flow | Non-perm Flow |
|---|---|---|---|---|---|
| 100 | 5.0 | 6.0 | 89.0 | — | — |
| 32.8 | 0.2 | 5.0 | 94.8 | 121 | 59 |
| 49.4 | 0.7 | 5.6 | 93.6 | 122 | 119 |
| 67.3 | 1.8 | 5.8 | 92.4 | 115 | 237 |
| 74.0 | 2.3 | 5.9 | 91.8 | 116 | 330 |
| 80.5 | 2.9 | 6.3 | 90.8 | 116 | 479 |

EXAMPLE 3

A third test cell was assembled in much the same fashion as the test cell of Example 2. This configuration was designated a mini test cell device and had an approximate surface area of about 4.0 m².

This device was also operated at 25° C. and with a mixed gas stream at 135 psig. The mini test cell device was also operated by adjusting the non-perm flow such that it represented some percentage (recovery) of the total flow from both the non-perm port and the perm port. The average non-perm composition from three test runs at a given recovery as well as permeate and non-permeate flow for two feed compositions are listed below in Table IV and Table V. The unit of gas flow in these tables is sL/min.

TABLE IV

| Recovery | % $O_2$ | % $N_2$ | % Xe | Perm Flow | Non-perm Flow |
|---|---|---|---|---|---|
| 100 | 24 | 6 | 70 | — | — |
| 34.3 | 0.2 | 4.3 | 95.5 | 1.53 | 0.8 |
| 49.6 | 0.8 | 6.0 | 93.2 | 1.83 | 1.8 |
| 59.5 | 2.4 | 6.5 | 91.1 | 2.04 | 3.03 |

TABLE IV-continued

| Recovery | % O$_2$ | % N$_2$ | % Xe | Perm Flow | Non-perm Flow |
|---|---|---|---|---|---|
| 65.8 | 3.9 | 6.8 | 89.3 | 2.28 | 4.3 |

TABLE V

| Recovery | % O$_2$ | % N$_2$ | % Xe | Perm Flow | Non-perm Flow |
|---|---|---|---|---|---|
| 100 | 5 | 6 | 89 | — | — |
| 33.0 | 0.1 | 3.5 | 96.4 | 1.00 | 0.5 |
| 50.7 | 0.1 | 3.9 | 96.0 | 1.07 | 1.10 |
| 68.7 | 0.2 | 4.7 | 95.1 | 1.14 | 2.50 |
| 75.5 | 0.4 | 5.1 | 94.4 | 1.20 | 3.70 |

EXAMPLE 4

A blend of 9,9-bis(3,5-dibromo-4-hydroxyphenyl) fluorene polycarbonate (TBBHPFPC), N-methylpyrrolidone (NMP) and triethylene glycol (TEG) was extruded through a multi-hole spinnerette, through an air gap (air quench zone) and into a liquid quench bath. From the liquid bath, the fiber was passed into a second liquid bath, and was taken up on a package leesona. The hollow fibers were then air-dried. The fibers were tested for membrane properties as in Example 1. The ratio of oxygen flux to nitrogen flux was found to be 6.4, and the ratio of oxygen flux to xenon flux was found to be 21.1.

The invention may be further modified, in ways that will be apparent to those skilled in the art. Such modifications should be considered within the spirit and scope of the following claims.

What is claimed is:

1. A method of separating a noble gas from oxygen, nitrogen, or carbon dioxide, or a mixture thereof, using three membranes, comprising the steps of:

a) contacting one side of a first semi-permeable membrane comprising a thin discriminating layer selected from the group consisting of polycarbonate, polyester, and polyestercarbonate, said first semi-permeable membrane exhibiting an oxygen/noble gas permselectivity of at least 21, with a feed gas mixture under pressure;

b) maintaining a pressure differential across the first membrane under conditions such that a component of the feed gas selectively permeates through the first membrane from a high pressure side of the first membrane to a low pressure side of the first membrane;

c) removing a first permeated gas, which is enriched in a faster permeating component, from the low pressure side of the first membrane;

d) removing a first retentate gas, which is enriched in a slower permeating component, from the high pressure side of the first membrane;

e) contacting one side of a second semi-permeable membrane comprising a thin discriminating layer selected from the group consisting of polycarbonate, polyester, and polyestercarbonate, said second semi-permeable membrane exhibiting an oxygen/noble gas permselectivity of at least 21, with the first retentate gas under pressure;

f) maintaining a pressure differential across the second membrane under conditions such that a component of the first retentate gas selectively permeates through the second membrane from a high pressure side of the second membrane to a low pressure side of the second membrane;

g) removing a second permeated gas, which is enriched in a faster permeating component, from the low pressure side of the second membrane and recycling it to the feed gas mixture under pressure;

h) removing a second retentate gas, which is more enriched in a slower permeating component, from the high pressure side of the second membrane;

i) re-pressurizing the first permeated gas to produce a re-pressurized first permeated gas;

j) contacting one side of a third membrane comprising a thin discriminating layer selected from the group consisting of polycarbonate, polyester, and polyestercarbonate, said third membrane exhibiting an oxygen/noble gas permselectivity of at least 21, with said re-pressurized first permeated gas;

k) maintaining a pressure differential across the third membrane, under conditions such that a component of the re-pressurized permeated gas selectively permeates through the third membrane from a high pressure side of the third membrane to a low pressure side of the third membrane;

l) removing permeated gas, which is enriched in a faster permeating component, from the low pressure side of the third membrane;

m) removing a third retentate gas, which is enriched in a slower permeating component, from the high pressure side of the third membrane and recycling it to the feed gas mixture under pressure; and n) storing the second retentate gas.

2. The method of claim 1, wherein each said discriminating layer is chosen to be a material selected from the bisphenolic group consisting of 2,2-bis(3,5-dibromo-4-hydroxyphenyl)propane, 2,2-bis(3,5-dichloro-4-hydroxyphenyl)propane, and 9,9-bis(3,5-dibromo-4-hydroxyphenyl)fluorene.

3. The method of claim 1, wherein each said discriminating layer of material is selected from the group consisting of polycarbonate, polyester, and polyestercarbonate, according to the formula:

wherein
R is, separately in each instance, selected from the group consisting of a single bond, a —CO—, —SO$_2$—, —O—, —S—, a $C_{1-15}$ divalent aliphatic, cycloaliphatic or aromatic hydrocarbon, a $C_{1-15}$ divalent halocarbon or inertly substituted hydrocarbon, and a $C_{1-15}$ UV or chemically activated hydrocarbon;

$R_1$ is, separately in each instance, selected from the group consisting of a hydrogen, a halogen, a $C_{1-6}$ alkyl, a $C_{1-6}$ haloalkyl, a $C_{1-4}$ alkoxy, and a $C_{1-9}$ alkyl-aryl or haloalkyl-aryl;

$R_2$ is, separately in each instance, selected from the group consisting of a hydrogen, a halogen, and a $C_{1-6}$ alkyl;

$R_3$ is, separately in each instance, selected from the group consisting of a $C_{1-20}$ divalent hydrocarbon and a $C_{1-20}$ halo substituted divalent hydrocarbon;

x is a number between 0 and 1;
y is a number between 1 and 0; and
n is a positive real number of about 20 or greater.

4. The method of claim 3, wherein:
R is an isopropylidene, hexafluoroisopropylidene or fluorene residue;
$R_1$ is, separately in each instance, selected from the group consisting of chlorine, bromine, and methyl;
$R_2$ is, separately in each instance, a hydrogen;
$R_3$ is, separately in each instance, a $C_{1-20}$ divalent hydrocarbon or a $C_{1-20}$ halo substituted divalent hydrocarbon.

5. The method of claim 3, wherein $R_3$ is selected from one of the following three formulae:

wherein $R_4$ is, separately in each instance, selected from the group consisting of hydrogen, bromine, chlorine, fluorine, phenyl, and halo-substituted alkyl; and a is a positive integer from 0 to not more than 6.

6. The method of claim 5, wherein $R_3$ is selected from the group consisting of a terephthaloyl residue, an isophthaloyl residue, and a mixture of a terephthaloyl and an isophthaloyl residue.

7. The method of claim 1, wherein the noble gas is selected from the group consisting of xenon and radon.

8. A method of separating a noble gas from oxygen, nitrogen, or carbon dioxide, or a mixture thereof, using three membranes, comprising the steps of:

a) contacting one side of a first semi-permeable membrane comprising a thin discriminating layer selected from the group consisting of polycarbonate, polyester, and polyestercarbonate, said first semi-permeable membrane exhibiting an oxygen/noble gas permselectivity of at least 21, with a feed gas mixture under pressure;

b) maintaining a pressure differential across the first membrane under conditions such that a component of the feed gas selectively permeates through the membrane from a high pressure side of the first membrane to a low pressure side of the first membrane;

c) removing a first permeated gas, which is enriched in a faster permeating component, from the low pressure side of the first membrane, d) removing a first retentate gas, which is enriched in a slower permeating component, from the high pressure side of the first membrane;

e) contacting one side of a second semi-permeable membrane comprising a thin discriminating layer selected from the group consisting of polycarbonate, polyester, and polyestercarbonate, said second semi-permeable membrane exhibiting an oxygen/noble gas permselectivity of at least 21, with the first retentate gas under pressure;

f) maintaining a pressure differential across the second membrane under conditions such that a component of the first retentate gas selectively permeates through the second membrane from a high pressure side of the second membrane to a low pressure side of the second membrane;

g) removing a second permeated gas, which is enriched in a faster permeating component, from the low pressure side of the second membrane and venting it to the atmosphere;

h) removing a second retentate gas, which is more enriched in a slower permeating component, from the high pressure side of the second membrane;

i) contacting one side of a third semi-permeable membrane comprising a thin discriminating layer selected from the group consisting of polycarbonate, polyester, and polyestercarbonate, said third semi-permeable membrane exhibiting an oxygen/noble gas permselectivity of at least 21, with the first permeated gas under pressure;

j) maintaining a pressure differential across the third membrane under conditions such that a component of the first permeated gas selectively permeates through the membrane from a high pressure side of the third membrane to a low pressure side of the third membrane;

k) removing a third permeated gas, which is enriched in a faster permeating component, from the low pressure side of the third membrane;

l) removing a third retentate gas, which is enriched in a slower permeating component, from the high pressure side of the third membrane and recycling it to the feed gas mixture under pressure; and m) storing the second retentate gas.

9. The method of claim 8, further comprising the step of recovering the second permeated gas and recycling it to the feed gas mixture under pressure.

10. The method of claim 8, wherein each said discriminating layer is chosen to be a material selected from the bisphenolic group consisting of 2,2-bis(3,5-dibromo-4-hydroxyphenyl)propane, 2,2-bis(3,5-dichloro-4-hydroxyphenyl)propane, and 9,9-bis(3,5-dibromo-4-hydroxyphenyl)fluorene.

11. The method of claim 8, wherein each said discriminating layer of material is selected from the group consisting of polycarbonate, polyester, and polyestercarbonate, according to the formula:

wherein
- R is, separately in each instance, selected from the group consisting of a single bond, a —CO—, —$SO_2$—, —O—, —S—, a $C_{1-15}$ divalent aliphatic, cycloaliphatic or aromatic hydrocarbon, a $C_{1-15}$ divalent halocarbon or inertly substituted hydrocarbon, and a $C_{1-15}$ UV or chemically activated hydrocarbon;
- $R_1$ is, separately in each instance, selected from the group consisting of a hydrogen, a halogen, a $C_{1-6}$ alkyl, a $C_{1-6}$ haloalkyl, a $C_{1-4}$ alkoxy, and a $C_{1-9}$ alkyl-aryl or haloalkyl-aryl;
- $R_2$ is, separately in each instance, selected from the group consisting of a hydrogen, a halogen, and a $C_{1-6}$ alkyl;
- $R_3$ is, separately in each instance, selected from the group consisting of a $C_{1-20}$ divalent hydrocarbon and a $C_{1-20}$ halo substituted divalent hydrocarbon;
- x is a number between 0 and 1;
- y is a number between 1 and 0; and
- n is a positive real number of about 20 or greater.

12. The method of claim 11, wherein:
R is an isopropylidene, hexafluoroisopropylidene or fluorene residue;
$R_1$ is, separately in each instance, selected from the group consisting of chlorine, bromine, and methyl;
$R_2$ is, separately in each instance, a hydrogen;
$R_3$ is, separately in each instance, a $C_{1-20}$ divalent hydrocarbon or a $C_{1-20}$ halo substituted divalent hydrocarbon.

13. The method of claim 11, wherein $R_3$ is selected from one of the following three formulae:

wherein $R_4$ is, separately in each instance, selected from the group consisting of hydrogen, bromine, chlorine, fluorine, phenyl, and halo-substituted alkyl; and a is a positive integer from 0 to not more than 6.

14. The method of claim 13, wherein $R_3$ is selected from the group consisting of a terephthaloyl residue, an isophthaloyl residue, and a mixture of a terephthaloyl and an isophthaloyl residue.

15. The method of claim 8, wherein the noble gas is selected from the group consisting of xenon and radon.

* * * * *